United States Patent [19]

Robinson et al.

[11] Patent Number: 5,189,878
[45] Date of Patent: Mar. 2, 1993

[54] VEHICULAR EXHAUST POLLUTION REDUCER

[76] Inventors: Antonio Robinson, 3850 Hudson Manor Ter. #2B, Riverdale, N.Y. 10463; George Spector, 233 Broadway RM 3815, New York, N.Y. 10007

[21] Appl. No.: 706,179
[22] Filed: May 28, 1991
[51] Int. Cl.$^5$ ............................................. F01N 3/02
[52] U.S. Cl. ........................................ 60/309; 55/228; 55/DIG. 30; 60/310
[58] Field of Search .................. 60/309, 310; 55/DIG. 30, 276, 228

[56] References Cited

U.S. PATENT DOCUMENTS

| | | | |
|---|---|---|---|
| 2,084,435 | 6/1937 | Deremer | 60/309 |
| 2,921,432 | 1/1960 | Marcotte | 60/309 |
| 3,605,389 | 9/1971 | Buttler | 60/309 |
| 3,630,030 | 12/1971 | Wagner | 60/310 |
| 4,249,375 | 2/1981 | Grundmann | 60/309 |

FOREIGN PATENT DOCUMENTS

| | | | |
|---|---|---|---|
| 2914159 | 10/1980 | Fed. Rep. of Germany | 60/309 |
| 2134979 | 8/1984 | United Kingdom | 60/309 |

Primary Examiner—Douglas Hart

[57] ABSTRACT

An exhaust gas and pollutant trap is provided for an exhaust system of a motor vehicle, in which the exhaust system is of the type having an engine exhaust pipe and a muffler. The trap consists of a solid support and connection pipe affixed between the engine exhaust pipe and the muffler of the exhaust system of the motor vehicle. A first mechanism included in the trap is carried by the solid support and condenses water vapor from the exhaust gases coming through the engine exhaust pipe. A second mechanism included in the trap, sprays condensed water into the exhaust gases entering the muffler, whereby exhaust gases and solid pollutants are saturated with water and to fall downward to reduce atmosphere contamination.

4 Claims, 1 Drawing Sheet

VEHICULAR EXHAUST POLLUTION REDUCER

BACKGROUND OF THE INVENTION

The instant invention relates generally to devices for removing pollutants from exhaust gases of internal combustion engines and more specifically it relates to a exhaust gas trap for an exhaust system of a motor vehicle which provides a mechanism to reduce aroma and volatility of exhaust gases.

There are available various conventional devices for removing pollutants from exhaust gases of internal combustion engines which do not provide the novel improvements of the invention herein disclosed.

SUMMARY OF THE INVENTION

A primary object of the present invention is to provide a exhaust products trap for an exhaust system of a motor vehicle that will overcome the shortcomings of the prior art devices.

Another object is to provide exhaust trap for an exhaust system of a motor vehicle that will spray water from a condensation tank into the entrance of the muffler of the exhaust system so that the exhaust gas will get wet and lose its volatilization and not contaminate the atmosphere.

An additional object is to provide an exhaust gas trap for an exhaust system of a motor vehicle that includes an air actuated slide valve to ventilate the condensation tank to help condense the water vapor from the exhaust gases within the condensation tank.

A further object is to provide an exhaust trap for an exhaust system of a motor vehicle that is simple and easy to use.

A still further object is to provide an exhaust trap for an exhaust system of a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
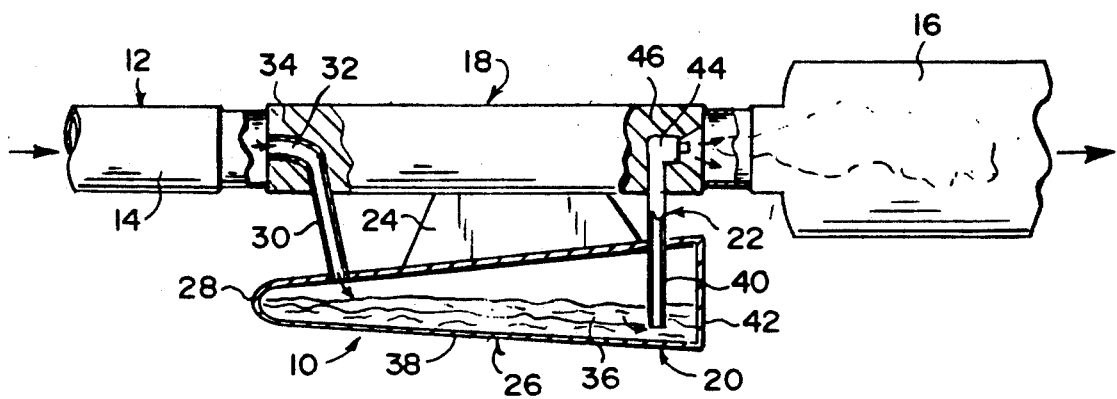
FIG. 1 is a side view with parts broken away and in section of the instant invention mounted within the exhaust system of a motor vehicle.

Turning now descriptively to the drawings, in which similar reference characters denote similar elements throughout the several views, the figures illustrate an exhaust trap 10 for an exhaust system 12 of a motor vehicle, in which the exhaust system 12 is of the type having an engine exhaust pipe 14 and a muffler 16. The trap 10 includes a solid support and pipe 18 affixed between the engine exhaust pipe 14 and the muffler 16 of the exhaust system 12 of the motor vehicle. A first mechanism 20 is carried by the solid support for condensing some of the vapor from the exhaust gases coming through the engine exhaust pipe 14. A second mechanism 22 is for spraying condensed water into the exhaust gases entering the muffler 16 from pipe 18 whereby exhaust gases will get wet, to decrease its volatility and contamination of the atmosphere by sinking towards the ground due to water saturation.

The first condensing mechanism 20 includes a bracket 24 extending downwardly from the solid support. A conical shaped condensation tank 26 is affixed to the bracket 24 below the solid support so that a narrow end 28 of the tank 26 faces forward toward the front of the motor vehicle. An inlet exhaust transfer pipe 30 has a wide mouth portion 32 in the forward end 34 of the solid support to catch some of the exhaust gases coming through the engine exhaust pipe 14. The inlet exhaust transfer pipe 30 extends downwardly from the forward end 34 of the solid support of pipe 18 to enter proximate the forward narrow end 28 of the condensation tank 26. The water vapor in the exhaust gases entering the cooler condensation tank 26 will condense into water 36 in the bottom 38 of the condensation tank 26.

The spraying mechanism 22, includes an outlet exhaust transfer pipe 40 extending upwardly from proximate a rearward wide end 42 and near the bottom 38 of the condensation tank 26. A spray head 44 is in the rearward end 46 of the solid support and is fluidly connected to the outlet exhaust transfer pipe 40. The spray head 44 sprays water 36 from the bottom 38 of the condensation tank 26 into the exhaust gases entering the muffler 16, connected to pipe 18.

Figure 2:
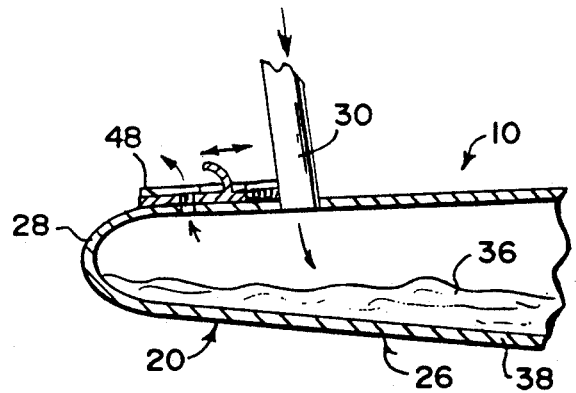
FIG. 2 is an enlarged cross sectional view of the forward end of the water condenser tank showing a modification being an air actuated slide valve.

As shown in FIG. 2, the trap 10 further includes an air actuated slide valve 48 on top of the forward narrow end 28 of the condensation tank 26. When the motor vehicle is traveling in a forward movement the air actuated slide valve 48 will open by air pressure to ventilate and cool further the condensation tank 26, to help condense the water vapor from the exhaust gases within the condensation tank 26. It is to be noted that the slide valve 48 is forced by air pressure rearwardly to open against normally closing spring pressure as is evident from FIG. 2. Thus the faster the vehicle velocity, the greater will the valve 48 open thereby increasing cooling ventilation of tank 26 by relieving a build up of exhaust gas pressure in tank 26.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An exhaust trap for an exhaust system of a motor vehicle the exhaust system having an engine exhaust pipe and a muffler, said trap comprising:
   a) a support and connecting pipe affixed between the engine exhaust pipe and the muffler of the exhaust system of the motor vehicle;
   b) trapping and condensing means carried by said support, for trapping some exhaust and condensing water vapor and solids coming through the engine exhaust pipe; and
   c) means for spraying condensed water into the exhaust entering the muffler through said connecting pipe.

2. A trap as recited in claim 1, wherein said trapping and condensing means includes:
   a) a bracket extending downwardly from said solid support;
   b) a conical shaped condensation tank affixed to said bracket below said solid support, so that a narrow end of said tank faces forward towards the front of the motor vehicle; and
   c) an inlet exhaust transfer conduit having an inlet in the forward end of said solid support to trap some exhaust gases coming through the engine exhaust pipe, while said inlet exhaust transfer conduit extends downwardly from the forward end of said solid support to enter proximate the forward narrow end of said condensation tank, whereby the water vapor in the exhaust gases entering said condensation tank will condense into water in the bottom of said condensation tank.

3. A trap as recited in claim 2, wherein said spraying means includes:
   a) an outlet exhaust transfer pipe extending upwardly from proximate a rearward wide end and near the bottom of said condensation tank; and
   b) a spray head in the rearward end of said solid support and fluidly connected to said outlet exhaust transfer pipe so that said spray head water from the bottom of said condensation tank into the exhaust gases entering the muffler; from said connecting pipe.

4. A trap as recited in claim 3, wherein said tank further includes a normally closed slide valve actuated to open position by ambient air pressure when the motor vehicle is traveling to ventilate and cool said condensation tank to help condense the water vapor from the exhaust gases within said condensation tank.

* * * * *